(12) United States Patent
Xiu et al.

(10) Patent No.: US 9,467,397 B2
(45) Date of Patent: Oct. 11, 2016

(54) PORT MODE SYNCHRONIZATION BETWEEN SWITCHES

(71) Applicant: Hangzhou H3C Technologies Co., Ltd., Hangzhou (CN)

(72) Inventors: Yihong Xiu, Beijing (CN); Zhenglin Qi, Beijing (CN); Daogui Liu, Beijing (CN); Yutao Li, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/403,882

(22) PCT Filed: Oct. 31, 2013

(86) PCT No.: PCT/CN2013/086283
§ 371 (c)(1),
(2) Date: Nov. 25, 2014

(87) PCT Pub. No.: WO2014/067470
PCT Pub. Date: May 8, 2014

(65) Prior Publication Data
US 2015/0350111 A1   Dec. 3, 2015

(30) Foreign Application Priority Data

Oct. 31, 2012  (CN) .......................... 2012 1 0426838
Oct. 31, 2012  (CN) .......................... 2012 1 0427003

(51) Int. Cl.
*H04L 12/28*   (2006.01)
*H04L 12/933*  (2013.01)
*H04L 12/931*  (2013.01)
*H04L 12/413*  (2006.01)

(52) U.S. Cl.
CPC ............. *H04L 49/15* (2013.01); *H04L 12/413* (2013.01); *H04L 49/351* (2013.01); *H04L 49/602* (2013.01); *H04L 49/65* (2013.01)

(58) Field of Classification Search
USPC ....... 370/254, 354, 474, 392, 535, 477, 401, 370/400, 409; 709/239
See application file for complete search history.

(56) References Cited

U.S. PATENT DOCUMENTS

| 7,079,525 | B1 | 7/2006 | Goldstein et al. |
| 2001/0005383 | A1* | 6/2001 | Yoshimoto .......... H04L 12/4608 370/474 |
| 2009/0296726 | A1 | 12/2009 | Snively et al. |
| 2014/0044126 | A1* | 2/2014 | Sabhanatarajan ....... H04L 45/02 370/354 |

FOREIGN PATENT DOCUMENTS

| CN | 102123467 | 7/2011 |
| CN | 102215067 | 10/2011 |

OTHER PUBLICATIONS

International Search Report and Written Opinion dated Jan. 30, 2014 issued on PCT Patent Application No. PCT/CN2013/086283 dated Oct. 31, 2013, The State Intellectual Property Office, P.R. China.

* cited by examiner

*Primary Examiner* — Chi H Pham
*Assistant Examiner* — Alexander O Boakye
(74) *Attorney, Agent, or Firm* — Hewlett Packard Enterprise Patent Department (57) ABSTRACT

According to an example, after a primary port of a primary switch and a secondary port of a secondary switch are connected to each other and the primary port is configured to operate in a fabric mode, the primary switch may send a mode switch request packet to the secondary switch through the primary port. The secondary switch may change the secondary port from operating in an Ethernet mode to the fabric mode based on information contained in the mode switch request packet and may send a mode switch response packet to the primary switch.

13 Claims, 4 Drawing Sheets

PORT MODE SYNCHRONIZATION BETWEEN SWITCHES

CLAIM FOR PRIORITY

The present application is a national stage filing under 35 U.S.C. 371 of PCT application number PCT/CN2013/086283, having an international filing date of Oct. 31, 2013, which claims priority to Chinese patent application number 201210427003.4 having a filing date of Oct. 31, 2012, and to Chinese patent application number 201210426838.8 having a filing date of Oct. 31, 2012 the disclosures of which are hereby incorporated by reference in their entireties.

BACKGROUND

In a stack switch system, i.e., a switch fabric, fabric ports of switches are communicatively coupled to each other and send fabric packets via respective ports. A chip typically generates a fabric packet by adding a fabric header to an Ethernet packet to be forwarded in the switch fabric. However, if a port on a switch in the switch fabric is configured to operate as an Ethernet port and receives the fabric packet, the switch containing the Ethernet port often discards the fabric packet due to the existence of a cyclic redundancy check (CRC) error.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

The examples of the present disclosure will be illustrated in detail hereinafter with reference to the accompanying drawings.

Figure 1:
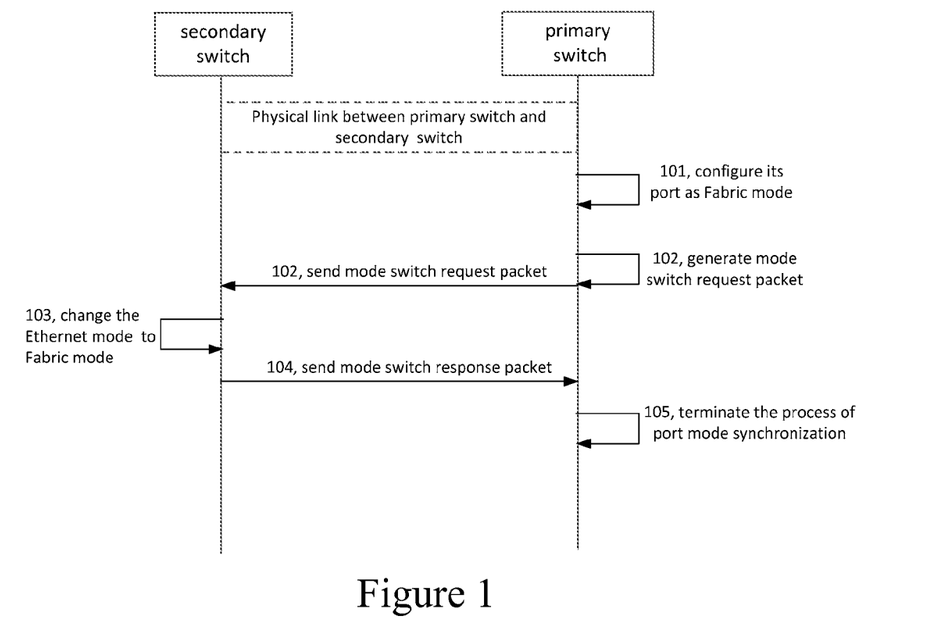
FIG. 1 is a schematic diagram illustrating a signaling process of port mode synchronization between switches according to an example of the present disclosure.

By taking a primary switch and a secondary switch as an example, an implementation of port mode synchronization between switches of a stack switch system according to an example of the present disclosure will be illustrated in detail hereinafter with reference to FIG. 1. As used herein, the terms "primary" and "secondary" are not intended to denote hierarchy, but instead, may be construed as distinguishing peer elements from each other. According to an example, the primary switches may be Controlling Bridges (CBs) and the secondary switches may be Port Extenders (PEs). The primary switches may connect to each other in a ring or chain topology over stacking links and each of the secondary switches may connect to one or more primary switches via physical links. Likewise, for convenience of reference, a port on a primary switch is referred to as a "primary port" and a port on a secondary switch is referred to as a "secondary port".

In order to connect network switches to each other, when a system, such as a stack switch system, is configured, a primary port of the primary switch and a secondary port of the secondary switch may be connected to each other by a physical line. Usually, each port of the network switches is configured based on factory settings, that is, each port is configured to operate in an Ethernet mode by default. In other words, the ports of network switches are typically not configured to operate in a fabric mode, i.e., within a switch fabric or a stack switch system. According to an example of the present disclosure, the port modes of the ports of network switches in a switch fabric or, equivalently, a stack switch system, may automatically be synchronized with each other to operate in the fabric mode. The port mode synchronization process may include the following operations.

In block 101, the primary port of the primary switch may be configured to operate in a fabric mode. Specifically, the primary port of the primary switch may be manually configured to operate in the fabric mode.

In block 102, after the primary switch detects that the primary port is configured to operate in the fabric mode, the primary switch may generate a mode switch request packet and may send the mode switch request packet to the secondary switch via the primary port.

Specifically, the primary switch may check the mode state of the primary port. When the primary switch detects that the primary port is configured to operate in the fabric mode, the primary switch may configure a register of the primary port as an Ethernet packet check mode, may generate the check information of the mode switch request packet based on the Ethernet packet check mode indicated by the register of the primary port, and may generate the mode switch request packet through insertion of information contained in an Ethernet payload part of the mode switch request packet to cause the secondary switch to change the secondary port from operating in an Ethernet mode to the fabric mode. According to an example, the information is contained in a fabric header of the Ethernet payload part of the mode switch request packet. In another example, the information is contained in a packet identifier in the Ethernet payload part of the mode switch request packet.

The primary switch may send the mode switch request packet to the secondary switch via the primary port. After sending the mode switch request packet, the primary switch may configure the register of the primary port in a fabric packet check mode and may wait for a mode switch response, which may be a mode switch response packet, from the secondary switch.

Figure 2A:
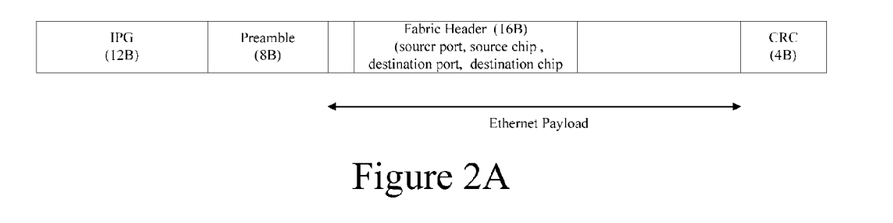
FIG. 2A is a schematic diagram illustrating the format of a mode switch request packet according to an example of the present disclosure.
Figure 2B:
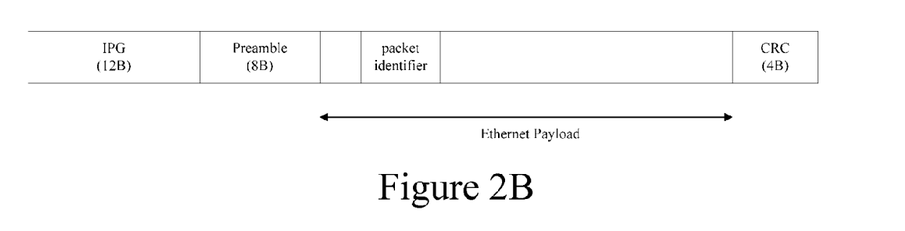
FIG. 2B is a schematic diagram illustrating the format of a mode switch request packet according to another example of the present disclosure.

The mode switch request may be an Ethernet packet, and an example of a format of the mode switch request is shown in FIG. 2A. The fabric header may be contained in the Ethernet payload of the mode switch request packet and may include a source port number, a source chip number, a destination port number, a destination chip number, and a local priority of the packet. According to an example, the fabric header may be used to instruct the primary switch receiving the packet to change its port from operating in the Ethernet mode to the fabric mode. In another example, shown in FIG. 2B, the Ethernet payload part of the mode switch request may carry a packet identifier which instructs a receiving switch (e.g., the secondary switch) of the packet to change a receiving port (e.g., the secondary port) from operating in the Ethernet mode to the fabric mode.

In block 103, the secondary switch may change the secondary port from operating in the Ethernet mode to the fabric mode based on the received mode switch request packet.

According to an example in which the mode switch request includes fabric header, after receiving the mode switch request packet via the secondary port, the secondary switch may perform a cyclic redundancy check (CRC) for the mode switch request packet based on the Ethernet packet check mode indicated by a register of the secondary port. After the CRC is passed, the secondary switch may change the secondary port from operating in the Ethernet mode to the fabric mode based on the fabric header in the mode switch request packet. Prior to this change, however, the CPU of the secondary switch may parse the mode switch request packet and may obtain the fabric header. Due to the mode switch request packet being an Ethernet packet, the secondary port may operate in the Ethernet mode and the register of the secondary port may indicate the Ethernet check mode, the secondary switch may implement the CRC for the mode switch request packet correctly. Because the secondary port switch may be unable to parse the fabric header contained in the Ethernet payload part of the mode switch request packet, report the mode switch request packet may be reported to the CPU of the secondary switch, and the CPU may parse the fabric header through software.

The secondary switch may learn, based on the fabric header, that the primary port has been configured to operate in the fabric mode, and may then change the secondary port from operating the Ethernet mode to the fabric mode.

According to another example, in which the Ethernet payload part of the mode switch request carries a packet identifier which instructs the secondary switch to change the secondary port from operating in the Ethernet mode to the fabric mode, after receiving the mode switching request packet via the secondary port, the secondary switch may perform a CRC check to the mode switch request packet based on the Ethernet packet checking mode indicated by a register of the secondary port. After the CRC check is passed, the secondary switch may parse the mode switching request to obtain the packet identifier carried in the Ethernet payload part, and may change the secondary port through which the mode switch request packet is received from the Ethernet mode to the fabric mode according to the packet identifier. The mode switch request packet may be an Ethernet packet and the CRC checking mode of the mode switch request packet may be the Ethernet packet checking mode. The receiving port of the mode switching request may be configured under factory settings, i.e., the Ethernet mode, and the register of the receiving port may indicate the Ethernet packet checking mode. Therefore, the secondary switch may check and parse the mode switch request packet correctly.

In block 104, the secondary switch may send a mode switch response packet to the primary switch via the secondary port, and the primary switch may terminate the port mode synchronization between the two switches after receiving the mode switch response packet.

Specifically, after changing the secondary port from operating in the Ethernet mode to the fabric mode, the secondary switch may send the mode switch response packet via the secondary port to indicate that the secondary port has been configured to operate in the fabric mode. The mode switch response packet may be a fabric packet. Because the register of the primary port has been configured to operate in the fabric packet check mode, the primary switch may correctly check and parse the mode switch response packet.

Considering connection failures or other reasons, the secondary switch may be unable to receive the mode switch request packet from the primary switch, so that the primary switch may be unable to receive the mode switch response packet from the secondary switch for a long time after the mode switch request packet is sent. To compensate for this potential failure, the port mode synchronization between the primary and secondary switches may further include the following operations.

If the primary switch does not receive the mode switch response packet from the secondary switch within a predetermined time after the mode switch request packet is sent to the secondary switch, the primary switch may generate a new mode switch request packet, and may send the new mode switch request packet to the secondary switch via the primary port of the secondary switch. If the primary switch receives the mode switch response packet from the secondary switch within the predetermined time after the new mode switch request packet is sent to the secondary switch, the primary switch may terminate the process of the port mode synchronization between the two switches. A specific implementation of generating the mode switch request packet and sending the mode switch request packet to the secondary switch via the port of the primary switch refers to block 102 and is not illustrated in detail herein.

After the primary switch sends the mode switch request packet to the secondary switch; the primary switch may start a timer. The primary switch may delete the timer after the mode switch response packet is received from the secondary switch. Expiration of the timer may be an indication that the primary switch did not receive the mode switch response packet from the secondary switch within the duration of the timer, and thus it may be uncertain whether the port of the secondary switch has been changed from operating in the Ethernet mode to the fabric mode. In this case, the primary switch may resend the mode switch request packet to the secondary switch to request the primary switch to change the port of the secondary switch from operating in the Ethernet mode to the fabric mode, thereby ensuring port mode synchronization between the secondary switch and the primary switch. The duration of the timer may be determined based on the requirements of switch performance and application scenes.

It can be seen from the above process of the port mode synchronization between switches that the primary switch may configure its port to operate in the fabric mode and may send the mode switch request packet having the Ethernet format to the secondary switch, and the information to cause the change may be contained in the Ethernet payload part of the mode switch request packet. In this way, the secondary switch may automatically change its port from operating in the Ethernet mode to the fabric mode based on the information contained in the mode switch request packet. This automatic switching may solve the problem of automatic negotiation between the Ethernet port of a switch and the fabric port of another switch and may enable the fabric packet to be correctly received and parsed, while facilitating the forwarding of the fabric packet.

The implementation of port mode synchronization between switches provided by an example of the present disclosure may be applied to a stack switch system. The stack switch system may include multiple Controlling Bridges (CBs) and multiple Port Extenders (PEs), and the ports of the CBs and PEs may all be configured to operate in the Ethernet mode by default.

Figure 3:
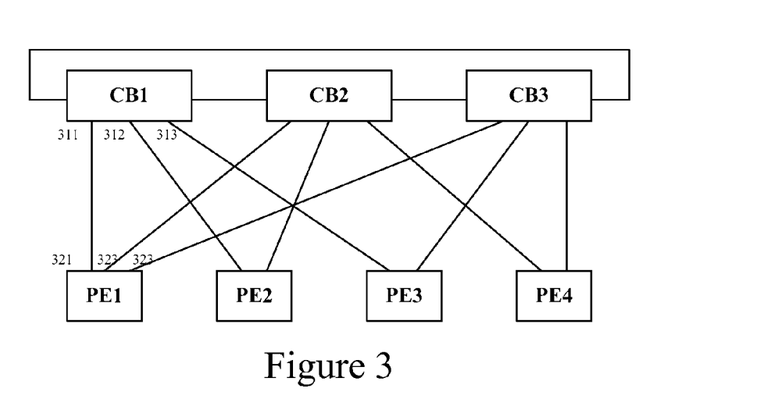
FIG. 3 is a schematic diagram illustrating the structure of a stack switch system according to an example of the present disclosure.

The ports of the PEs and the ports of the CBs may be connected to each other according to a connection relationship shown in FIG. 3 to establish a stack switch system. CB1-CB3 connect to each other in a ring topology via stacking links. The PE1-PE4 do not directly connected to each other. The CB1 and the PE1 in the stack switch system are taken as exemplary switches to describe the port mode synchronization. After the stack switch system is formed, ports 311-313 on CB1 may connect to PE1-PE3 respectively, ports 321-323 on PE1 may connect to CB1-CB3 respectively. Ports 311-313 may all be configured to operate in the fabric mode. After CB1 detects that port 311 is configured in the fabric mode, CB1 may configure the register of port 311 to operate in an Ethernet packet check mode, may generate the check information of a mode switch request packet based on the Ethernet packet check mode indicated by the register of port 311, and may send the mode switch request packet to PE1 via port 311, where the Ethernet payload part of the mode switch request packet may contain information to cause the change, e.g., a fabric header or a packet identifier. After PE1 receives the mode switch request packet via port 321, PE1 may check the mode switch request packet based on the Ethernet packet check mode indicated by the register of port 311 of PE1. After the check is passed, PE1 may change port 321 from operating in the Ethernet mode to the fabric mode based on the information after parsing the mode switch request packet and obtaining the information (fabric header or packet identifier) contained in the mode switch request packet, thereby realizing mode synchronization between port 311 and port 321.

Similarly, CB1 may also automatically perform port mode synchronization with PE2 and PE3 based on the above process.

Similarly, CB2 or CB3 may automatically perform port mode synchronization with PE1, PE2 and PE3 based on the above process.

When there are a large number of switches in the stack switch system, the implementation of port mode synchronization between switches provided by an example of the present disclosure may decrease user configuration operations and enable realization of plug and play dynamic stack application.

The implementation of port mode synchronization between switches provided by an example of the present disclosure may be applied to, but is not limited to, a stack switch system.

Figure 4:
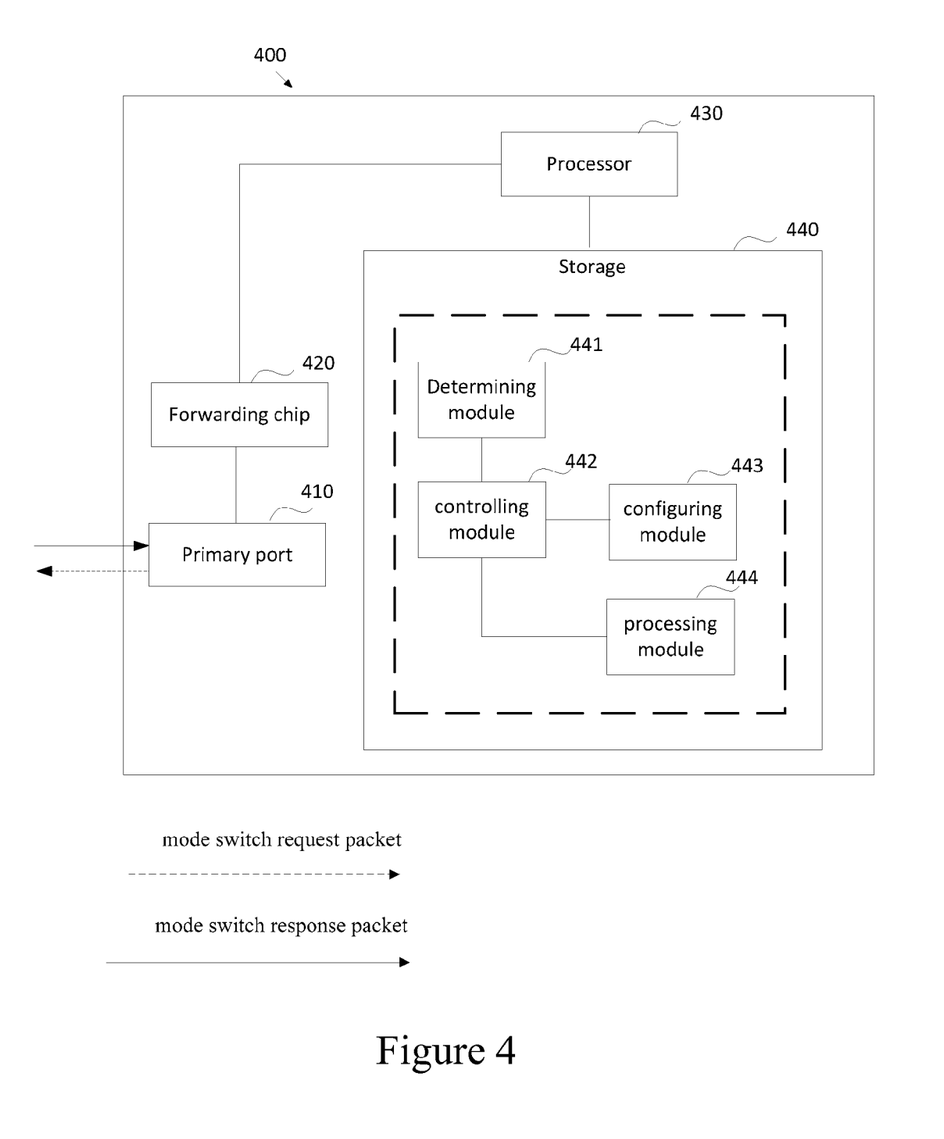
FIG. 4 is a schematic diagram illustrating the structure of a network device according to an example of the present disclosure.

An example of the present disclosure also provides a network switch, as shown in FIG. 4. The network switch 400 may include a primary port 410 interconnecting the switch 400 with a secondary port of a peer switch; a forwarding chip 420, a processor 430, and a storage 440 coupled with the processor 420. The chip 420 transmits a mode switch request packet generated by the processor 430 to the primary port 410 for sending the mode switch request packet to the peer switch; and transmits a mode switch response packet received at the primary port 410 to the processor 430 for analyzing and processing. The storage 440 comprises one or more program modules to be executed by the processor 430, the one or more program modules comprise: a checking module 441, a controlling module 442, a configuring module 443, and a processing module 444.

The checking module 441 may check whether the primary port interconnecting to the peer switch is configured to operate in a fabric mode.

The controlling module 442 may send a first indication to the configuring module 443 and may send a second indication to the processing module 444 after the checking module 441 detects that the primary port is configured to operate in the fabric mode. The controlling module 442 may also send a third indication to the configuring module 443 after the processing module 444 sends the mode switch request packet, and may wait for the mode switch response packet from the peer switch. The controller module 442 may further terminate the process of port mode synchronication between the switch and the peer switch after the mode switch response packet is received from the peer switch via the primary port, where the mode switch response packet is sent by the peer switch after the peer switch changes the port of the peer switch from operating in the Ethernet mode to the fabric mode based on the information contained in the mode switch request packet.

The configuring module 443 may configure the register of the primary port to operate in an Ethernet packet check mode based on the first indication sent by the controlling module 442 and may configure the register of the primary port to operate in the fabric mode based on the third indication sent by the controlling module 442.

The processing module 44 may, based on the second indication sent by the controlling module 442, generate the check information of the mode switch request packet based on the Ethernet packet check mode indicated by the register of the primary port, and may send the mode switch request packet, where the Ethernet payload part of the mode switch request packet contains the information (fabric header or packet identifier) for instructing the peer switch to change its interconnecting port from operating in the Ethernet mode to the fabric mode.

The controlling module 442 may further, after the processing module 44 sends the mode switch request packet, if the mode switch response packet from the peer switch is not received via the primary port within a predetermined time, send the first indication to the configuring module 443, send the second indication to the processing module 444, send the third indication to the configuring module 443 after the processsing module 44 sends the mode switch request packet, and wait for the mode switch response packet from the peer switch.

Figure 5:
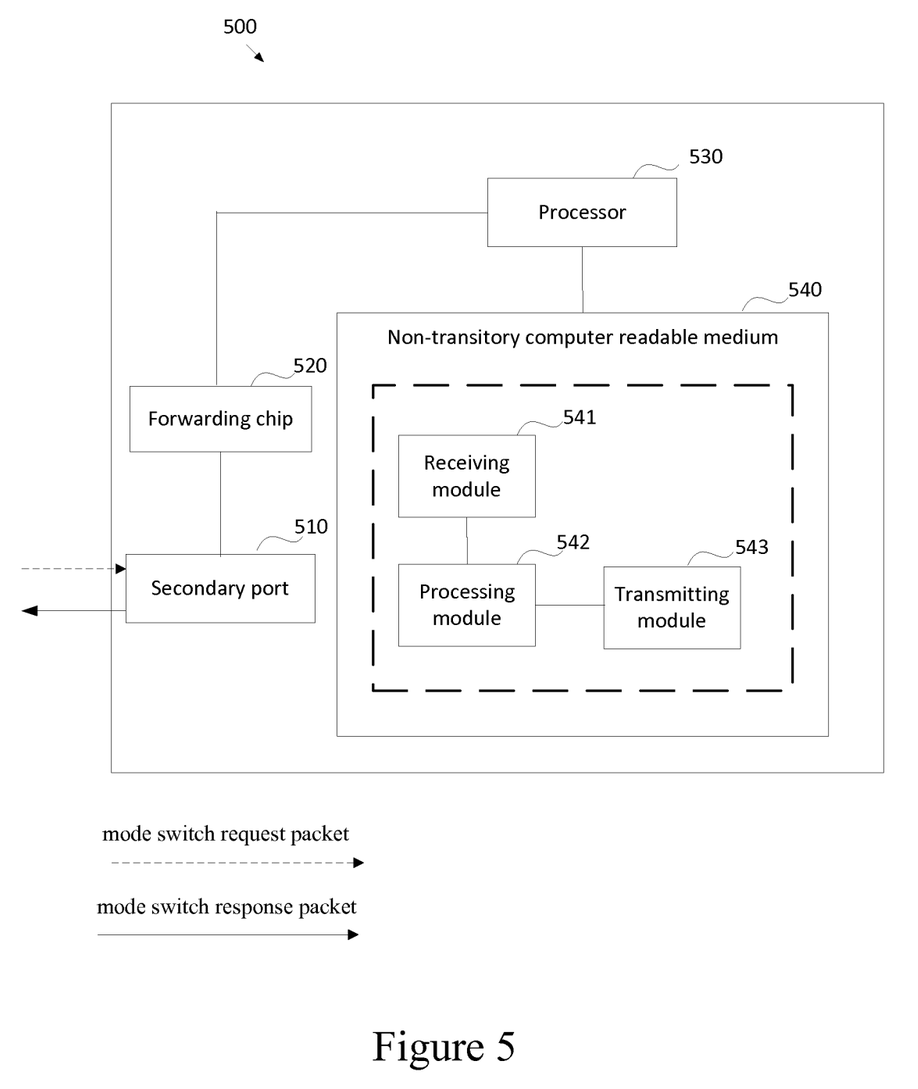
FIG. 5 is a schematic diagram illustrating the structure of a network device according to another example of the present disclosure.

An example of the present disclosure may also provide a network switch, as shown in FIG. 5. The network switch may include a secondary port 510 interconnecting the switch 500 with a primary port of a peer switch; a forwarding chip 520, a processor 530, and a storage 540 coupled with the processor 530. The forwarding chip 520 transmits a mode switch request packet received at the secondary port 510 to the processor 530 for analyzing and processing, and transmits a mode switch response packet generated by the processor 530 to the secondary port 510 for sending the mode switch request packet to the peer switch; The storage 540 comprises one or more program modules to be executed by the processor 530, the one or more program modules comprise: a receiving module 541, a processing module 542, and a sending module 543.

The receiving module 541 may receive a mode switch request packet received at the secondary port 510, where the mode switch request packet may be sent by the peer switch and the mode switch request packet may be an Ethernet packet.

The processing module 542 may change the secondary port 510 from operating in an Ethernet mode to the fabric mode based on information (fabric header or packet identifier) contained in the mode switch request packet.

The sending module 543 may send a mode switch response packet after the processing module 542 changes the secondary port from operating in the Ethernet mode to the fabric mode.

The processing module 542 may check the mode switch request packet based on an Ethernet packet check mode indicated by the register of the secondary port, report the mode switch request packet to the processor 530(CPU of the switch) after the check is passed, and change the secondary port of the switch from operating in the Ethernet mode to the fabric mode based on the information (fabric header or packet identifier) after the processory 530(CPU) parses the mode switch request packet and obtains the information (fabric header or packet identifier) in the Ethernet payload of the mode switch request packet.

An example of the present disclosure may also provide a stack switch system, which includes a primary switch and a secondary switch. The primary port of the primary switch and the secondary port of the secondary switch may be connected to each other, and the primary port may be configured to operate in a fabric mode.

The primary switch may configure the register of the primary port as an Ethernet packet check mode and may generate the check information of the mode switch request packet based on the Ethernet packet check mode indicated by the register of the primary port. The primary switch may also send the mode switch request packet to the secondary switch via the primary port, configure the register of the primary port as the fabric mode, and wait for a mode switch response packet from the secondary switch, where the Ethernet payload part of the mode switch request packet contains information (fabric header or packet identifier) for instructing the secondary switch to change the secondary port from operating in an Ethernet mode to the fabric mode. The primary switch may further terminate the port mode synchronization after the mode switch response packet is received at the primary port.

The secondary switch may receive the mode switch request packet from the primary switch via the secondary port, change the secondary port from operating in the Ethernet mode to the fabric mode based on the information (fabric header or packet identifier) in the mode switch request packet, and send the mode switch response packet to the primary switch via the secondary port.

The primary switch may further periodically configure the register of the port of the primary switch to operate in the Ethernet packet check mode, generate the check information of the mode switch request packet based on the Ethernet packet check mode indicated by the register of the port of the primary switch, send the mode switch request packet to the secondary switch via the primary port, configure the register of the primary port to operate in the fabric mode, and wait for a mode switch response packet from the secondary switch, if the primary switch does not receive the mode switch response packet from the secondary switch within each predetermined time The secondary switch may check the mode switch request packet based on the Ethernet packet check mode indicated by the register of the secondary port, and may report the mode switch request packet to the CPU of the secondary switch after the check is passed. The secondary switch may also change the secondary port from operating in the Ethernet mode to the fabric mode based on the information (fabric header or packet identifier) after the CPU parses the mode switch request packet and obtains the information (fabric header or packet identifier) contained in the Ethernet payload part of the mode switch request packet.

In examples of the present disclosure, after the ports of two switches are connected to each other and the port of a first switch is configured to operate in the fabric mode, the first switch may send the mode switch request packet containing the information (fabric header or packet identifier) to the peer switch via the port of the first switch, to request the peer switch to change the port of the peer switch from operating in the Ethernet mode to the fabric mode. As such, port mode synchronization between the two switches may be realized, and fabric packets between the two switches may be correctly received and parsed.

The methods and modules disclosed herein may be realized by software accompanied by general hardware platforms, or by hardware. For instance, the methods and modules disclosed herein may be implemented by logic circuitry such as one or more application specific integrated circuits (ASICs) or integrated circuits or as machine readable instructions stored in a memory and executable by a processor. According to an example, the methods disclosed herein may be in the form of a computer software product, and the computer software product may be stored in a computer readable storage medium and may include machine-readable instructions to make a network switch (such as a switch or router) perform the methods disclosed herein.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method of port mode synchronization between a primary switch and a secondary switch in a stack switch system, wherein a primary port on the primary switch and a secondary port on the secondary switch are connected to each other, and wherein the primary port is configured to operate in a fabric mode, the method comprising:

configuring, by the primary switch, a register of the primary port to operate in an Ethernet packet check mode;

generating check information of a mode switch request packet based on the Ethernet packet check mode indicated by the register of the primary port;

sending the mode switch request packet to the secondary switch via the primary port, wherein an Ethernet payload part of the mode switch request packet contains information to cause the secondary switch to change the secondary port from operating in an Ethernet mode to the fabric mode;

waiting for a mode switch response from the secondary switch; and terminating, by the primary switch, port mode synchronization between the primary switch and the secondary switch after the mode switch response is received at the primary port, wherein the mode switch response is sent by the secondary switch after the secondary switch changes the secondary port from operating in the Ethernet mode to operating in the fabric mode.

2. The method of claim 1, further comprising:

determining whether the primary switch has received the mode switch response from the secondary switch within a predetermined time after the mode switch request packet is sent to the secondary switch; and in response to a determination that the primary switch has not received the mode switch response from the secondary switch within the predetermined time, configuring, by the primary switch, the register of the primary port as the Ethernet packet check mode, generating check information of a new mode switch request packet based on the Ethernet packet check mode indicated by the register of the primary port, sending the new mode switch request packet to the secondary switch via the primary port, configuring the register of the primary port to operate in the fabric mode, and waiting for the mode switch response from the secondary switch.

3. The method of claim 1, wherein the information to cause the secondary switch to change the secondary port from operating in an Ethernet mode to the fabric mode is either a fabric header contained in the Ethernet payload part of the mode switch request packet or a packet identifier contained in the Ethernet payload part of the mode switch request packet.

4. A method of port mode synchronization between a primary switch and a secondary switch in a stack switch system, wherein a primary port on the primary switch and a secondary port on the secondary switch are connected to each other, and wherein the primary port is configured to operate in a fabric mode, the method comprising:

receiving, by the secondary switch, a mode switch request packet at the secondary port;

changing the secondary port from operating in an Ethernet mode to the fabric mode based on information contained in the mode switch request packet, wherein the mode switch request packet is sent by the primary switch after the primary switch detects that the primary port is configured to operate in the fabric mode, and wherein the mode switch request packet is an Ethernet packet; and sending, by the secondary switch, a mode switch response to the primary switch via the secondary port.

5. The method of claim 4, wherein the information contained in the mode switch request packet is a fabric header contained in the Ethernet payload part of the mode switch request packet and wherein changing the secondary port from operating in the Ethernet mode to the fabric mode based on the information contained in the mode switch request packet comprises:

checking, by the secondary switch, the mode switch request packet based on an Ethernet packet check mode indicated by a register of the secondary port;

reporting the mode switch request packet to the CPU of the secondary switch in response to the checking being passed; and changing, by the secondary switch, the secondary port from operating in the Ethernet mode to the fabric mode based on the fabric header after the CPU of the secondary switch parses the mode switch request packet and obtains the fabric header contained in an Ethernet payload part of the mode switch request packet.

6. The method of claim 4, wherein the information contained in the mode switch request packet is a packet identifier carried in an Ethernet payload part of the mode switch request packet and wherein changing the secondary port from operating in the Ethernet mode to the fabric mode based on the information contained the mode switch request packet comprises:

checking, by the secondary switch, the mode switch request packet based on an Ethernet packet check mode indicated by a register of the secondary port;

in response to the checking passing, parsing the mode switch request packet to obtain the packet identifier carried in the Ethernet payload part of the mode switch request packet; and changing the secondary port from operating in the Ethernet mode to the fabric mode based on the packet identifier.

7. A network switch, comprising: a checking module, a controlling module, a configuring module, and a processing module, wherein:

the checking module is to check whether a port connecting to a peer switch is configured to operate in a fabric mode;

the controlling module is to send a first indication to the configuring module and send a second indication to the processing module after the checking module detects that the port is configured to operate in the fabric mode, send a third indication to the configuring module after the processing module sends a mode switch request packet to the peer switch, and wait for a mode switch response from the peer switch, and to terminate port mode synchronication between the network switch and the peer switch after the mode switch response is received from the peer switch via the port of the network switch, wherein the mode switch response packet is sent by the peer switch after the peer switch changes the port of the peer switch from operating in the Ethernet mode to the fabric mode based on information contained in the mode switch request packet;

the configuring module is to configure a register of the port as an Ethernet packet check mode based on the first indication sent by the controlling module and to configure the register of the port as the fabric mode based on the third indication sent by the controlling module; and the processing module is to, based on the second indication sent by the controlling module, generate the check information of the mode switch request packet based on the Ethernet packet check mode indicated by the register of the port, and send the mode switch request packet via the port, wherein an Ethernet payload part of the mode switch request packet contains the information to instruct the peer switch to change its port from operating in the Ethernet mode to the fabric mode.

8. The network switch of claim 7, wherein the controlling module is further to, after the processing module sends the mode switch request packet to the peer switch via the port of the switch, if the switch does not receive the mode switch response packet from the peer switch via the the port within a predetermined time, send the first indication to the configuring module, send the second indication to the processing module, send the third indication to the configuring module after the processsing module sends the mode switch request packet to the peer switch, and wait for the mode switch response packet from the peer switch.

9. The network switch of claim 7, wherein the information contained in the mode switch request packet is contained in a fabric header of the Ethernet payload part of the mode switch request packet or contained in a packet identifier in the Ethernet payload part of the mode switch request packet.

10. A network switch, comprising:
a receiving module, a processing module, and a sending module,
wherein:
the receiving module is to receive a mode switch request packet via a port connecting to a peer switch, wherein the mode switch request packet is sent by the peer switch and the mode switch request packet is an Ethernet packet;
the processing module is to change the port from operating in an Ethernet mode to a fabric mode based on information contained in the mode switch request packet;
the sending module is to send a mode switch response to the peer switch via the port after the processing module changes the port of the switch from operating in the Ethernet mode to the fabric mode; and
the information contained in the mode switch request packet is one of:
a fabric header contained in the Ethernet payload part of the mode switch request packet and wherein the processing module is to check the mode switch request packet based on an Ethernet packet check mode indicated by a register of the port, report the mode switch request packet to the CPU of the switch after the check is passed, and change the port from operating in the Ethernet mode to the fabric mode based on the fabric header after the CPU parses the mode switch request packet and obtains the fabric header in an Ethernet payload of the mode switch request packet; and
packet identifier carried in an Ethernet payload part of the mode switch request packet and wherein the processing module is to check the mode switch request packet based on an Ethernet packet check mode indicated by a register of the port, in response to the checking passing, parse the mode switch request packet to obtain the packet identifier carried in the Ethernet payload part of the mode switch request packet, and switch the port from operating in the Ethernet mode to the fabric mode based on the packet identifier.

11. A stack switch system comprising:
a primary switch and a secondary switch,
wherein a primary port of the primary switch and a secondary port of the secondary switch are connected to each other and the primary port is configured to operate in a fabric mode;
the primary switch is to, after it is detected that the primary port is configured to operate in the fabric mode, configure a register of the primary port as an Ethernet packet check mode, generate check information of a mode switch request packet based on the Ethernet packet check mode indicated by the register of the primary port, send the mode switch request packet to the secondary switch via the primary port, and wait for a mode switch response packet from the secondary switch, where an Ethernet payload of the mode switch request packet contains information to cause the secondary switch to change the port of the secondary switch from operating in an Ethernet mode to the fabric mode; and to terminate port mode synchronization between the primary switch and the secondary switch after a mode switch response is received from the secondary switch via the primary port; and
the secondary switch is to receive the mode switch request packet from the primary switch via the secondary port, change the secondary port from operating in the Ethernet mode to the fabric mode based on the information contained in the mode switch request packet, and send the mode switch response to the primary switch via the secondary port.

12. The stack switch system of claim 11, wherein the primary switch is further to, determine whether the primary switch has received the mode switch response packet from the secondary switch within a predetermined time after the mode switch request packet is sent to the secondary switch, configure the register of the primary port as the Ethernet packet check mode, generate the check information of a new mode switch request packet based on the Ethernet packet check mode indicated by the register of the primary port, send the mode switch request packet to the secondary switch via the secondary port, configure the register of the primary port to operate in the fabric mode, and wait for the mode switch response packet from the secondary switch.

13. The stack switch system of claim 12, wherein the information contained in the mode switch request packet is a packet identifier or fabric header carried in an Ethernet payload part of the mode switch request packet and wherein the secondary switch is to check the mode switch request packet based on an Ethernet packet check mode indicated by a register of the secondary port, in response to the checking passing, parse the mode switch request packet to obtain the packet identifier or fabric header carried in the Ethernet payload part of the mode switch request packet, and switch the secondary port from operating in the Ethernet mode to the fabric mode based on the packet identifier or fabric header.

* * * * *